Oct. 17, 1933.   W. J. PASINSKI   1,931,116
MEANS FOR GOVERNING THE SPEED OF ELECTRIC MOTORS
Filed Jan. 12, 1931   2 Sheets-Sheet 1

INVENTOR
Walter J. Pasinski
BY
Rector, Hibben, Davis & Macauley
ATTORNEYS

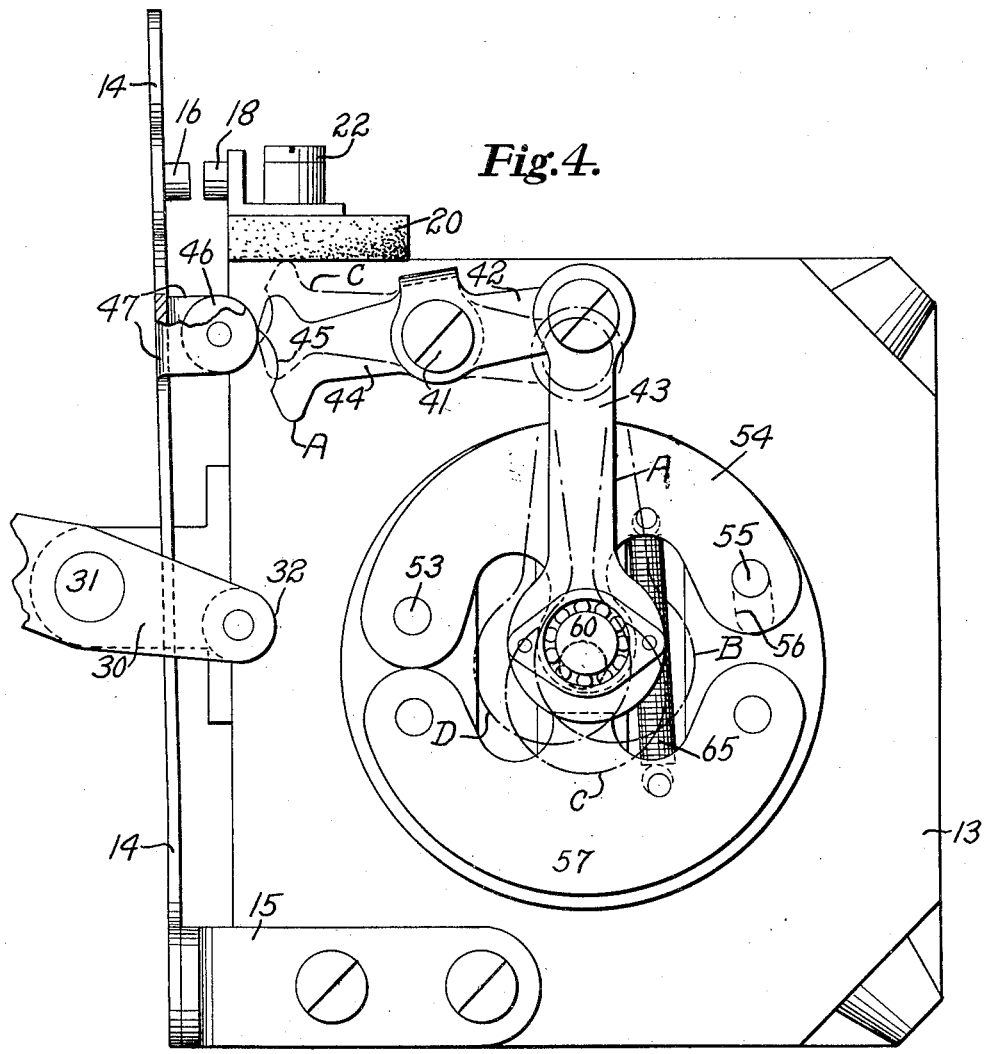
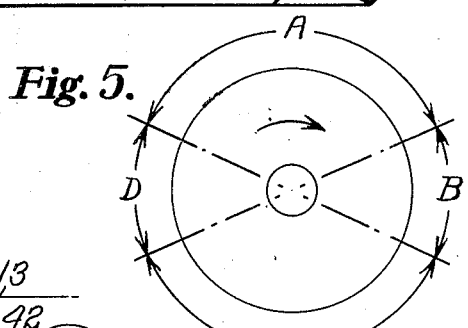
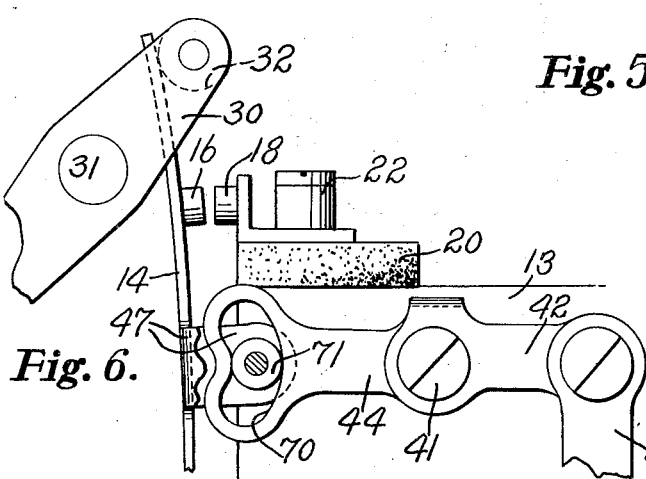

Patented Oct. 17, 1933

1,931,116

UNITED STATES PATENT OFFICE 1,931,116

MEANS FOR GOVERNING THE SPEED OF ELECTRIC MOTORS

Walter J. Pasinski, Detroit, Mich., assignor to Burroughs Adding Machine Company, Detroit, Mich., a corporation of Michigan Application January 12, 1931. Serial No. 508,129

10 Claims. (Cl. 171—222)

This invention relates to means for governing the speed of electric motors, particularly small motors of the series wound commutator type.

Various methods of regulating the speed of electric motors have already been devised including methods in which the circuit supplying energy to the motor is opened and closed in response to the speed of the motor. The practical difficulty with the method that opens and closes the motor circuit, and this difficulty has seemed almost insurmountable, is that, with the methods heretofore developed, the switch contacts will not stand up. The governors employed become ineffective very quickly, and one of the reasons for this is that, in the usual method of regulating motors, the switch contacts are separated gradually as the motor speed increases or decreases above the desired speed limit and this causes arcing.

The present invention comprehends an improved apparatus in which the motor circuit is positively and quickly opened and closed during each revolution of the motor and the speed is then governed by automatically controlling the length of time the circuit is opened relative to the time it is closed.

The general object of the invention is to provide an improved apparatus for governing the speed of an electric motor.

A more particular object is to provide an improved governor for use in controlling the speed of an electric motor.

Other and more particular objects will appear from the following specification and drawings.

An embodiment of the invention is shown in the accompanying drawings in which:

Fig. 4 is an end view of the governor illustrating the various positions to which some of the parts are moved.

Fig. 5 is a diagrammatic example showing the relative periods during which the motor circuit is opened and closed.

Fig. 6 is a partial sectional elevation of a modified form of control for the switch of the governor.

Figure 1:
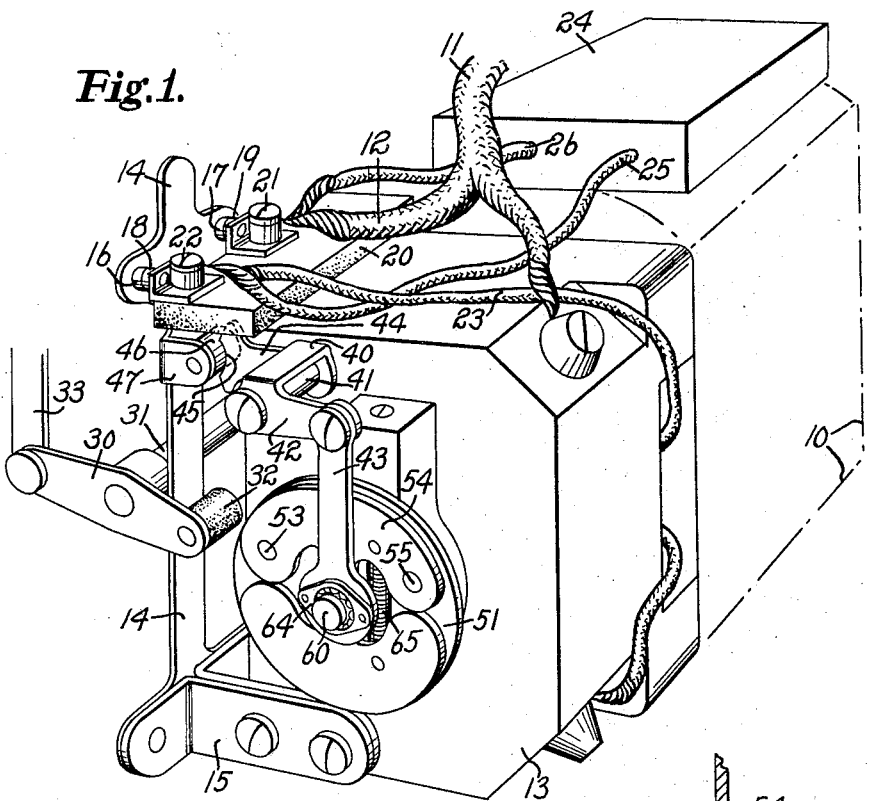
Figure 1 is a perspective view of the governor of the present invention applied to a motor.

The method of governing the speed of a motor will be most easily and clearly understood by describing the governor that is employed to carry the method into effect.

The governor is shown applied to a small series motor 10 of a type used to drive calculating machines. Small series motors of this kind have no constant running speed, but they have a high starting torque which is desirable. Their speed must be governed closely under quite a variety of conditions because the load varies considerably. Energy is supplied to the motor through a motor circuit 11, one side 12 of which passes through a switch that will be described presently.

The governor is mounted on an extension 13 of the motor housing and it includes a switch in the motor circuit together with certain mechanisms for actuating and controlling the switch.

The switch comprises a resilient arm 14 attached to a bracket 15 which, in turn, is attached to the housing 13. The upper end of the switch arm 14 is widened and it carries two contacts 16 and 17 which normally engage two similar contacts 18 and 19 mounted on the insulating block 20 on top of the housing 13. The side 12 of the motor circuit is attached to the contact 19 by a suitable binding screw 21 and the current passes from the motor circuit to the contacts 19—17, and through the switch arm 14 to the contacts 16—18, the latter being connected by a binding screw 22 to a conductor 23 leading to the motor. The switch 14 thus controls the supply of energy to the motor and it will be observed that, when the switch is opened, the circuit is broken at two points instead of one, which reduces arcing.

To further reduce arcing a condenser 24 is employed which is connected by the conductors 25 and 26 to the contacts 18 and 19.

The resiliency of switch arm 14 urges it to its closed position shown in Fig. 1, but, of course, it is not desired that the switch be closed when the motor is not to be used, and, consequently, controls are provided for holding the switch open. In the construction shown, the switch arm 14 is controlled by a lever 30 pivoted on the end of a shaft 31. On one end of this lever is a stud 32 of insulating material positioned so as to engage the switch arm 14 when the lever 30 is rocked. Connected to the other end of the lever is a link 33 that is controlled, preferably, from the motor starting bar of a calculating machine. The control of lever 30 is such that, when the calculating machine is not in operation, the lever 30 occupies a position such that the stud 32 engages the switch arm 14 and holds it away from the contacts 18 and 19 so as to maintain the motor circuit opened. However, when the motor bar of the calculating machine is depressed, the lever 30 is rocked so as to free the switch arm and allow it to move to a position to close the motor circuit. While in this position it is free to be controlled by certain parts of the governor that will now be explained.

The switch is positively and quickly opened and closed by means of an oscillatable member in the form of a yoke 40 pivoted on a stud 41 carried by the housing 13. One arm 42 of this yoke is connected to a link 43 which is reciprocated in a manner that will be described presently. The other arm 44 of this yoke has its outer end widened and provided with a curved slot 45 to receive a roller stud 46 carried by lugs 47 on the switch arm 14.

Figure 2:
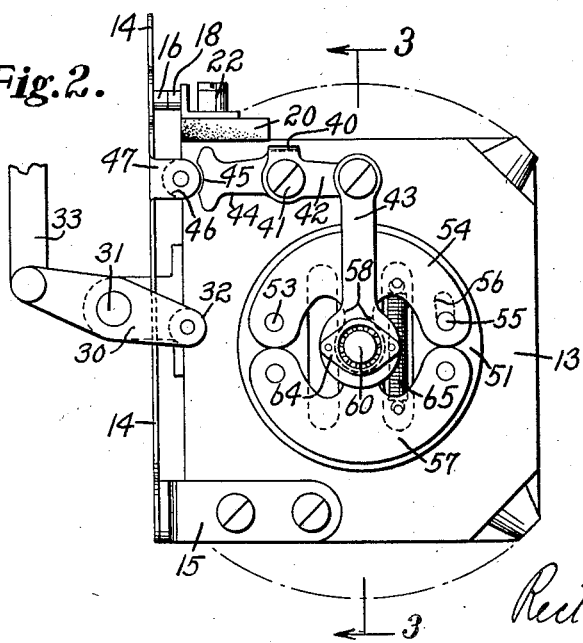
Fig. 2 is an end view of the governor shown in Fig. 1.

When the switch is closed, the roller stud 46 occupies the position shown in Figs. 1 and 2 where the stud is in the curved slot 45. It will be observed that, if the yoke 40 with its arm 44 is rocked either up or down, the high points on the outer end of the arm 44 will engage the roller stud 46 on the switch arm and move the switch to open position as shown in Fig. 4, where the yoke is shown in full lines in one of its extreme positions and in dot and dash lines in its other extreme position.

Figure 3:
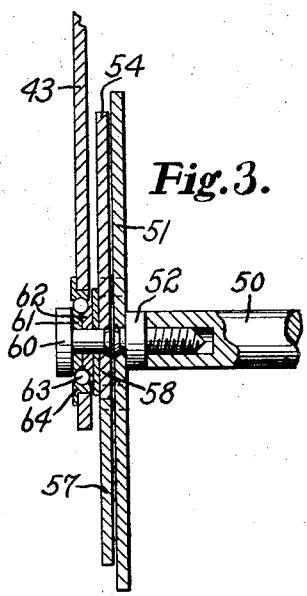
Fig. 3 is a partial section on the line 3—3 of Fig. 2.

The lower end of the link 43 that oscillates the yoke 40, is journalled on a bearing which, when the motor is at rest, is in axial alignment with a shaft 50 (Fig. 3) that is rotated by the motor. In the construction shown this shaft is an extension of the armature shaft, but it could be a separate shaft driven directly by or geared to the armature shaft. Provision is made for automatically moving the bearing out of alignment with the shaft 50 in response to the speed of the motor, the construction being as follows:

Fixed to the end of the shaft 50 is a circular plate 51, the plate being attached to the shaft by means of a screw 52 (Fig. 3) riveted on the plate. Pivoted at 53 (Fig. 2) is a semi-circular plate 54 in the nature of a centrifugal arm or weight, the free end of said arm being guided by a stud 55 on the arm which moves in a slot 56 in the plate 51. In order to balance the rotating parts a member 57, similar to arm 54, is fixed to the plate 51 but the arm 57 has no movement relative to plate 54.

The centrifugal arm 54 has a central portion 58 to which a stud 60 (Fig. 3) is fixed. The lower end of the link 43 is journaled on this stud by means of a ball bearing comprising two members 61 and 62 forming one raceway for the balls 63 and another member 64 forming the other raceway. The member 64 is attached to the link 43.

The centrifugal arm 54 is urged to the position shown in Figs. 1 and 2 by means of a spring 65 and when it is in this position, the bearing for the lower end of the link 43 is in axial alignment with the shaft 50. This is the position the parts occupy when the motor is at rest. As the motor starts to rotate, the circular plate 51 rotates and carries the centrifugal arm 54 with it. As the motor gains speed, the arm 54 tends to swing outwardly on its pivot 53 and this moves the bearing for the link 43 out of alignment with the shaft 50. The bearing rotates with the shaft because it is mounted on the arm 54 which rotates with disk 51 attached to the shaft. When the bearing is moved out of alignment with the shaft 50, it moves in a path concentric with the axis of shaft 50 and the effect on the link 43 is as if the link were connected to the shaft by a short crank. The length of this crank varies automatically with the distance that the centrifugal arm 54 moves outwardly. The result is, that, when the centrifugal arm moves outwardly so as to move the bearing for the link out of alignment with the shaft 50, the link is reciprocated up and down which results in oscillating the yoke member 40. During one revolution of the motor, the link 43 is moved once to its extreme upper position and once to its extreme lower position. This means that, during one revolution of the motor the yoke member 40 is first rocked in one direction from its central position, shown in Fig. 2, and returned after which it is rocked in the other direction from its center position and returned. The switch will thus be opened twice during each motor revolution because the switch is opened no matter in which direction from center the member 40 is rocked. The opening is positive and quick. It does not depend on springs or slow moving centrifugal devices. While the switch is shown as closing by its own resiliency, it can be positively closed if desired by connecting the oscillatable yoke 40 to the arm 14 by a cam that acts in both directions, as shown in Fig. 6.

It will be observed that, if the centrifugal arm 54 moves only a slight distance, the oscillation of the yoke member 40 will be very slight. While the switch will be opened twice during each motor revolution under these conditions, it will be opened only a very short instant each time and the period that it is open relative to the period that it is closed will be quite short. On the other hand, if the centrifugal arm 54 moves quite a distance, the amplitude of oscillation of the yoke member 40 will be relatively large and the switch will not only be opened twice during each motor revolution, but it will remain open a relatively long period as compared with the period during which it is closed. In other words, the amplitude of oscillation of the yoke member 40 is controlled in response to the speed of the motor and the period during which the switch is opened may be varied automatically with relation to the period during which it is closed, but, no matter what these relative periods, the switch will be positively opened and closed. In the construction shown the positive opening and closing occurs twice during each motor revolution, but this can be varied.

Fig. 5 represents diagrammatically an example of the relative periods of the opening and closing of the motor circuit, it being understood, of course, that these periods may vary. In Fig. 5 the arc A represents the period during which the switch remains open while the yoke 40 is oscillated to and from its full line position of Fig. 4, that is, from its Fig. 2 position to its Fig. 4 position and back again. Arc B represents the period the switch remains closed while the member is rocked back from its full line position toward its dot and dash position. Arc C represents the period during which the switch remains open while the yoke is being rocked to and from its dot and dash position of Fig. 4. Arc D represents the period the switch remains closed while the yoke is rocked from its dot and dash position past center to a point where the switch is again opened. When the position of the centrifugal arm changes these periods change. They may become equal and then vary in the opposite manner, that is, arcs B and D may become longer than A and C.

A slight modification in the control of the spring arm 14 of the switch is shown in Fig. 6. In this construction the arm 44 is provided with a cam slot 70 in which is positioned a roller 71 carried by the lugs 47 on the switch arm. The resiliency of arm 14 still tends to close the switch but the cam slot and roller provide a means for positively insuring movement of arm 14 to both open and closed positions during the governing control of the switch. The lever 30 is located near the top of arm 14 in this case so as to be able to open the switch no matter what the position of arm 44.

The method of governing the speed of a motor is as follows:

A motor is used having a larger capacity than is ordinarily required for driving the machine to which it is to be connected. In order to hold the speed of this motor constant regardless of variation in load it is necessary to open and close the circuit constantly and the governor above described is used for this purpose. It is regulated so that when the motor reaches the desired normal speed the governor will positively open and close the circuit during each revolution of the motor and the period that the circuit is opened being just sufficient to supply the motor with enough energy to run it at the desired speed.

If a heavier load is placed on the motor the speed is retarded whereupon the centrifugal member 54 of the governor moves toward its center of revolution and the amplitude of oscillation of the yoke member 40 is reduced so that the switch remains closed for a longer period of time and allows the motor to get more current. As a consequence the speed builds up and as the speed increases the governor automatically controls the amplitude of oscillation of the member 40 to maintain the speed at the desired amount.

If the load on the motor should be lightened it will speed up and the centrifugal arm 54 will be thrown out farther so as to increase the amplitude of oscillation of the yoke member 40. This will keep the switch open longer and reduce the supply of energy to the motor so that the speed of the motor automatically dies down and, as it dies down, the governor automatically changes the amplitude of oscillation of the member 40 so as to maintain the speed at the desired amount.

It will thus be seen that the speed of the motor is governed by controlling the supply of energy to the motor by positively opening and closing the switch in the energy supply circuit during each revolution of the motor, and then controlling the period during which the switch is open relative to the time when it is closed in response to the speed of the motor so as to vary the current supply in accordance with the load.

I claim:

1. In combination, a series motor, a power-supply circuit for said motor, a switch in said circuit, means actuated by said motor acting directly on said switch to positively and quickly open said switch periodically while the motor is operating, and means responsive to the speed of the motor acting on said switch-opening means to vary its operation to vary the periods that the switch is open relative to the periods that it is closed.

2. In combination, a series motor, a power supply circuit for said motor, a switch in said circuit, means actuated by said motor acting directly on said switch to positively and quickly open it during each revolution of the motor, and means responsive to the speed of the motor for varying the period that said switch is open during each revolution relative to the period that it is closed.

3. In combination, a series motor, a power-supply circuit for said motor, a switch in said circuit, mechanical means actuated by said motor acting directly on said switch to positively and quickly open and close said switch during each revolution of the motor, and means responsive to the speed of the motor acting on said mechanical means to vary the period that said switch is open during each revolution relative to the period that it is closed.

4. In combination, a motor having a motor circuit, a switch in said circuit, an oscillatable member for opening and closing said switch, means actuated by said motor for oscillating said member, and means responsive to the speed of the motor for automatically varying the amplitude of oscillation of said member.

5. In combination, a motor having a motor circuit, a switch in said circuit, an oscillatable member for opening and closing said switch, crank operated driving connections actuated by said motor for oscillating said member, and means responsive to the speed of said motor for automatically varying the throw of said crank driving connections.

6. In combination, a motor having a motor circuit, a switch in said circuit, an oscillatable member for opening and closing said switch, a link connected to said member and journaled on a stud which, when the motor is at rest, is in axial alignment with a shaft rotated by said motor, and means responsive to the speed of said motor for automatically moving said stud out of alignment with said shaft whereby the amplitude of vibration of said oscillatable member is varied in accordance with the speed of the motor.

7. In combination, a motor having a motor circuit, a switch in said circuit, an oscillatable member for opening and closing said switch, a link connected to said member and journaled on a stud which, when the motor is at rest, is in axial alignment with the motor armature shaft, and a centrifugal arm connected to said stud for moving the stud out of alignment with said shaft in response to the speed of the motor to thereby vary the amplitude of oscillation of said member.

8. In combination, a motor having a motor circuit, a switch in said circuit urged to closed position, a roller stud on said switch, an oscillatable member having a notch in which said stud normally seats, means actuated by said motor for oscillating said member to force said switch to open position, and means responsive to the speed of said motor for varying the amplitude of oscillation of said member.

9. In combination, a motor having a motor circuit, a switch in said circuit, a disk rotatable with said motor armature, a centrifugal arm on said disk carrying a stud in alignment with the armature shaft when the armature is stationary, a link journaled on said stud and connected to an oscillatable member having a portion acting on said switch to open and close the same as said member oscillates.

10. A speed governor for motors comprising a switch for controlling a motor circuit, an oscillatable member for opening and closing said switch, means adapted to be actuated by a motor for oscillating said member, and means responsive to the speed of the motor for varying the amplitude of oscillation of said member to thereby vary the period that said switch remains open relative to the period that it is closed.

WALTER J. PASINSKI.